Sept. 3, 1957 H. GÜNTHER ET AL 2,804,770
COLOR-FASTNESS TESTING
Filed Nov. 8, 1954 2 Sheets-Sheet 1

INVENTORS:
HERMANN GÜNTHER AND
HERBERT MEYER
BY

Sept. 3, 1957     H. GÜNTHER ET AL     2,804,770
COLOR-FASTNESS TESTING
Filed Nov. 8, 1954     2 Sheets-Sheet 2
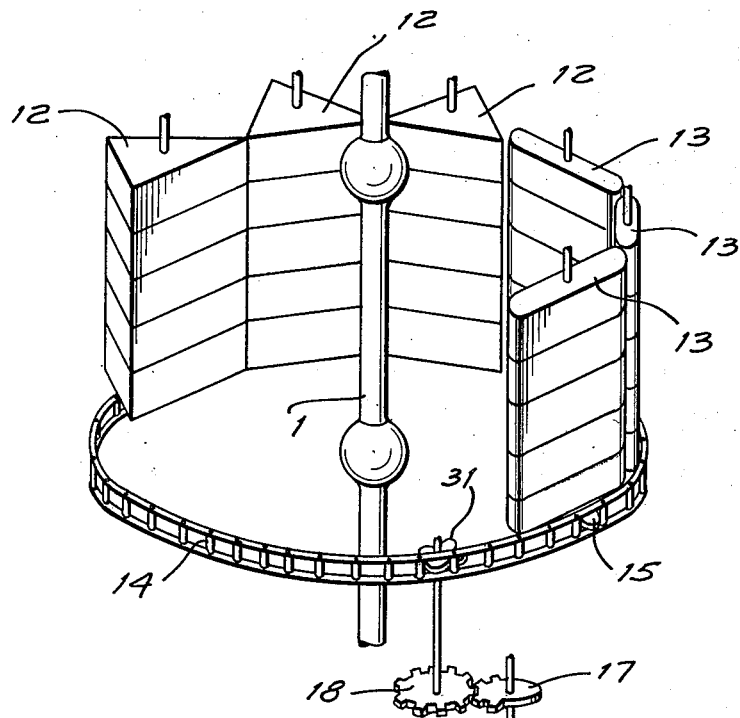
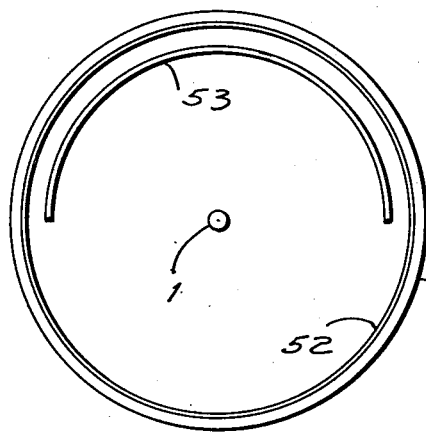
INVENTORS:
HERMANN GÜNTHER AND
HERBERT MEYER

United States Patent Office 2,804,770
Patented Sept. 3, 1957

2,804,770

COLOR-FASTNESS TESTING

Hermann Günther and Herbert Meyer, Hanau (Main), Germany

Application November 8, 1954, Serial No. 467,556

Claims priority, application Germany November 7, 1953

12 Claims. (Cl. 73—150)

The present invention relates to apparatus for color-fastness testing. More particularly the present invention provides an apparatus for testing the color-fastness of textile fabrics, paint and the like.

In the conventional testing procedures for determining the ability of material to withstand bleaching upon exposure to the rays of the sun, a specimen of the material to be tested is exposed to the sun or an artificial source of illumination for a predetermined time period. The change in the color of the specimen is then determined and the material receives a color-fastness rating which is obtained by extrapolating the change for the short time interval into a total change for a long time interval.

It has been found however that after such material is used for long periods of time its ability to withstand bleaching does not agree with the extrapolated value obtained by the short time interval testing procedure. The present invention permits a much more accurate color-fastness rating to be obtained than is possible with conventional methods while maintaining the total testing time for the material specimen substantially unchanged.

The present invention overcomes the disadvantages of previous testing methods by intermittently exposing the test specimen to a source of illumination. This has the advantage of reproducing the natural conditions to which the material is subjected after it is placed in commercial use. For example, if the material is a paint, it may be used for painting the exterior of a structure. Under these circumstances the paint on the structure is illuminated by the rays of the sun. However, between sundown and sunrise it is no longer subjected to such illumination. Therefore, the testing method in accordance with the present invention subjects the test specimen to alternate light and dark intervals, closely parallels the field conditions and provides a more accurate test than is available with present testing methods.

Accordingly it is an object of the present invention to provide apparatus for testing the color-fastness of a material.

Another object of the present invention is to provide for testing the color-fastness of a material by subjecting a specimen of a material to alternate light and dark intervals.

Still another object of the present invention is to provide an apparatus for testing the color-fastness of a material which includes means for varying the ratio between the darkened intervals and the illuminated intervals for a specimen.

A further object of the present invention is to provide a new and improved apparatus for simultaneously testing a plurality of specimens of a material.

With the above objects in view the present invention relates to an apparatus for testing the color-fastness of a specimen which includes means for mounting the specimen to be tested so as to be adapted to be illuminated, and means for intermittently illuminating the specimen.

The novel features which are considered as characteristic for the invention are set forth in particular in the appended claims. The invention with additional objects and advantages thereof, will be best understood from the following description of specific embodiments when read in connection with the accompanying drawings, in which:

Fig. 2 is a perspective schematic view of a second embodiment of the present invention;

Fig. 4 is a plan view of a fourth apparatus embodying the principles of the present invention and capable of carrying out the method thereof.

Figure 1:
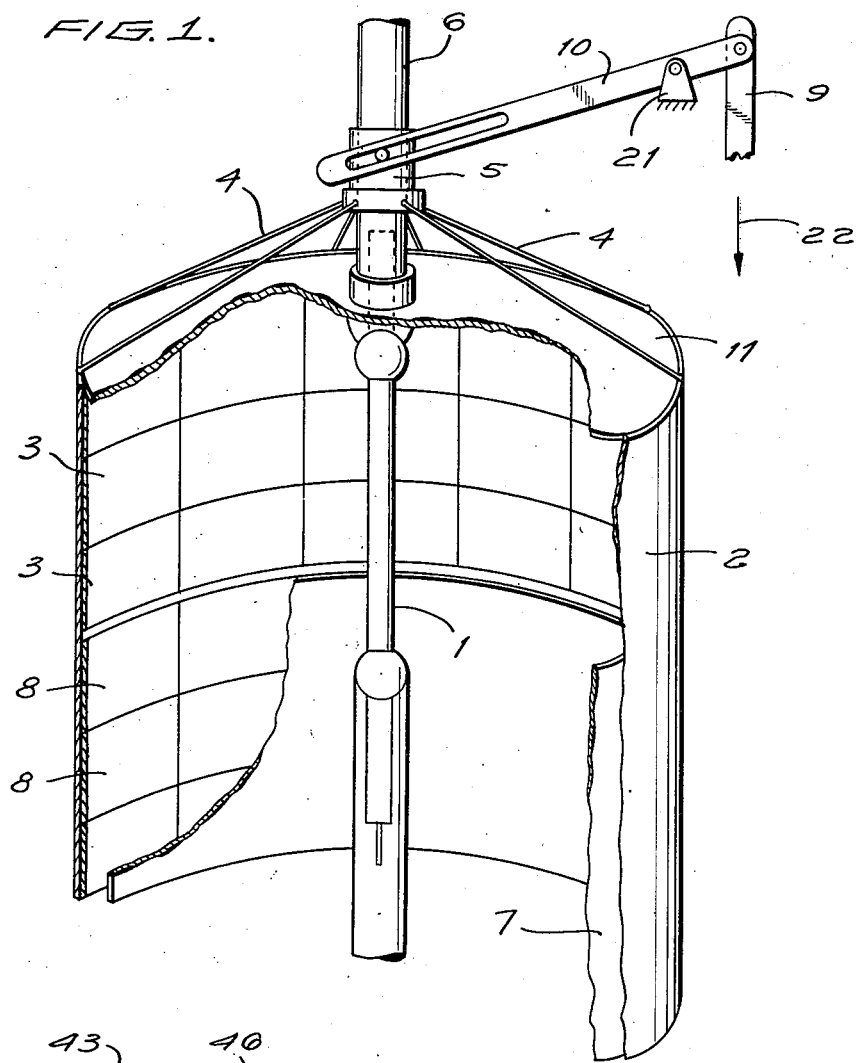
Fig. 1 is a perspective of one embodiment of the present invention.

Referring now to Fig. 1 it is seen that the source of illumination is enclosed within an elongated tube 1 which is mounted coaxially of a cylindrical mounting member 2. Mounted on the inner surface of the cylindrical member 2 is the specimen to be tested which is designated by numerals 3 and 8. That portion of the specimen which is designated by the numeral 3 is mounted in the upper half of the cylindrical member 2 and that portion designated 8 is mounted in the lower half.

The source 1 extends substantially the length of one-half of the cylindrical member 2. Mounted in the space between the source 1 and the portion 8 of the test specimen, is a shield 7 which is fixedly mounted by means not illustrated. At the upper end of the cylindrical member 2 is a second shield member 11 fixedly mounted adjacent the upper end of the source 1. The shield 11 extends transverse to the source 1 and substantially encloses one end of member 2.

The member 2 is attached to a collar 5 by means of tie rods 4. The collar 5 is slidably mounted on the rod 6 which has the source 1 attached to one end thereof. The collar 5 is coupled through a link member 10 to a lever 9. It can be seen that the lever 9 and the link member 10 may be pivoted about the fulcrum 21.

In operation the specimen of the material to be tested is mounted on the inner surface of the cylindrical member 2. If the material is paint it is simply brushed on the inner surface. If the material is some textile fabric it can be attached to this surface by any suitable conventional method. The apparatus is placed in the position illustrated and the source of illumination 1 is energized by means not illustrated. This source of illumination may be a xenon lamp, for example, wherein the energization is accomplished by applying igniting voltage to the electrodes of the lamp. As can be seen from Fig. 1 the illumination from the source 1 will reach the portion 3 of the sample and will be prevented by the shield 7 from reaching the portion 8 of the sample. It is apparent from the arrangement that the exposed portion 3 of the sample will be subjected to homogeneous rays of illumination from the source 1.

After a predetermined time interval, the lever arm 9 is moved in the direction of the arrow 22. This slides the collar 5 upwards along the rod 6. The collar 5 carries with it the cylindrical member 2 while the source 1 and the shield members 7 and 11 remain in the illustrated position. When the portion 8 of the sample occupies the position previously occupied by the portion 3 thereof, the upward motion of the mounting member 2 is stopped. In this position the portion 3 of the sample is up above the shield member 11 so that none of the illuminating rays of the source reach the portion 3.

In this second position, the portion 8 is illuminated for a second predetermined time interval whereupon the cylindrical member 2 may be returned to its original position. These operations may be repeated as many times as desired for equal or varying time intervals depending on the material tested and the strength of the source of illumination.

It is therefore seen that the embodiment of the apparatus illustrated in Fig. 1 is capable of carrying out the method of the present invention which includes the intermittent illumination of a test specimen in order to test for color-fastness. A second embodiment of such apparatus is illustrated in Fig. 2 wherein the source of illumination 1 is again coaxially mounted with the axis of an annular chain drive 14. Mounted above the chain drive are triangular prisms 12 which have 3 surfaces substantially parallel to the source of illumination 1.

Also mounted above the chain drive 14 are substantially rectangular flattened bodies 13 having rounded edges. The bodies 13 have two wide surfaces which are substantially parallel to the source 1. For reasons of simplicity, both types of prisms 12 and bodies 13 are shown mounted together. Actually, an apparatus can include either one or the other type or any combination desired. At the bottom end of each of the axes of the prisms 12 and the bodies 13 is a chain wheel 15 which meshes with the chain 14. The chain wheels 15 may have four operable members which are adapted to be rotated by the rotation of the chain 14. Chain 14 is driven by a gear 18 attached to a chain wheel 31 similar to the chain wheel 15. Engaging the gear 18 is one of a plurality of gears 17 mounted on a rotatable shaft 16.

It can be seen from the figure that each of the gears 17 has a different number of teeth which cover different portions of the circumference of the gear 17. For example, the top gear 17 has teeth covering 120° of its circumference; the center gear 17 has teeth covering 270° of its circumference; and the lowest gear 17 has teeth covering 90° of its circumference.

In operation the specimen to be tested may be mounted on the outer surfaces of the prisms 12 or the flattened bodies 13. In the event that the specimen to be tested is a textile fabric the rounded edges of the body 13 provide a convenient place for securing the fabric.

The source 1 is energized by means not illustrated and those surfaces of the bodies 12 and 13 that are facing the source 1 will receive illumination from the source 1. On the other hand the other two surfaces of the prism 12 are shielded from the source 1 as is the outer surface of the body 13. After a predetermined time interval the rod 16 is rotated to drive the chain 14 a distance depending on which of the gears 17 is meshed with the gear 18. The prisms can be rotated 120° at a time if desired so that the specimen will be on a darkened surface for two-thirds of the total cycle and on an illuminated surface for one-third of the cycle. In this case the darkened-to-illuminated ratio is 2 to 1.

If the flattened bodies 13 are used they can be rotated 180° at a time (2×90°) so that the darkened-to-illuminated ratio is 1 to 1. Similarly, it is apparent that any desired ratio can be obtained from apparatus of this type merely by having an elongated body similar to the bodies 12 or 13 with an appropriate number of surfaces parallel to the source 1.

Figure 3:
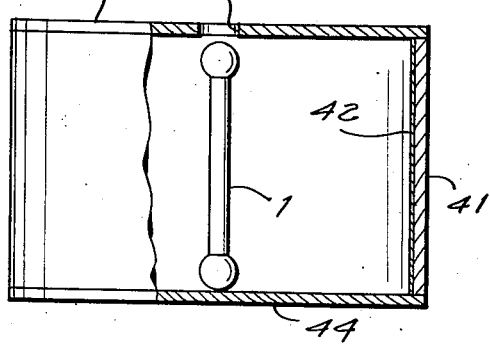
Fig. 3 is a longitudinal view of a third embodiment of apparatus incorporating the principles of the present invention.

Referring now to Fig. 3 a third embodiment of an apparatus capable of carrying out the method of the present invention is illustrated. In this figure it is seen that the source of illumination 1 is coaxially mounted with the axis of the cylindrical mounting member 41 to the inner surface of which the sample 42 may be secured. The cylindrical member 41 has a top shielding member 43 and a lower shielding member 44. The shielding member 43 has a centrally disposed passageway 46 which permits the removal and the entrance of the source 1 whenever desired.

Therefore in operation the source 1 is inserted through the shielding member 43 and is energized to illuminate the specimen on the inner surface of the cylindrical member 41. After the desired time interval the source is removed during which time the specimen receives no illumination. The source can be reinserted and removed continually depending on the type of specimen being tested.

In Fig. 4 the source 1 is mounted coaxially with the axis of a cylindrical member 51 to the inner surface of which, the specimen 52 may be secured. Disposed in the space between the source 1 and the specimen 52 is a shielding member 53 which may be fixedly mounted with respect to the source. If the shielding member 53 extends for a distance of 180° of the total inner surface of cylindrical member 51 it is apparent that half of the specimen 52 will be illuminated while the other half will be darkened due to the action of the shield 53.

Therefore the cylindrical member 51 may be rotated 180° at a time to interchange the positions of the darkened and illuminated portions of the specimen 52. Also the cylindrical member 41 may be continuously rotated so that one-half of the specimen is always darkened while the remaining half is illuminated.

In all the described embodiments the source of illumination that may be used is a xenon lamp or an equivalent lamp using any of the conventional inert gases. As is well known, the inert or noble gases emit light rays within the range of 3,000–9,500 Angstrom units which substantially covers the spectrum of the light rays emitted by the sun. A further advantage of the present invention is that a xenon lamp may be used which has an inner pressure considerably less than the conventional inner pressure of 3 atmospheres. The invention has been satisfactorily used with a xenon lamp having an inner pressure of 1 atmosphere. It is obvious that such a lamp is advantageous because it decreases by a substantial amount the danger of an explosion due to the difference in pressure between the inner pressure of the lamp and the atmospheric pressure.

This lower inner pressure also has the advantage of lowering the required ignition voltage of the lamp so that standard commercially available power sources may be used.

It will be understood that each of the elements described above, or two or more together, may also find a useful application in other types of test procedures differing from the types described above.

While the invention has been illustrated and described as embodied in an apparatus for testing the colorfastness of a specimen, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for testing the color-fastness of a specimen comprising, in combination, a cylindrical member having an inner mounting surface for a specimen; an elongated source of illumination mounted coaxially with the axis of said cylindrical member; a shielding member mounted between said source and said mounting surface for the specimen for preventing the illumination from said source from reaching a portion of the specimen; and means for moving one of said members with respect to the other member to prevent illumination from said source from reaching a different portion of the specimen.

2. Apparatus for testing the color-fastness of a specimen comprising, in combination, a cylindrical member having an inner mounting surface for a specimen; an elongated source of illumination mounted coaxially with the axis of said cylindrical member; a shielding member mounted between said source and said mounting surface for the specimen for preventing the illumination from said source from reaching the lower half of the specimen; and means for moving one of said members with respect to the other member to prevent illumination from said source from reaching the upper half of the specimen while simultaneously permitting illumination from said source to reach the lower half of the specimen.

3. Apparatus for testing the color-fastness of a specimen comprising, in combination, a cylindrical member having an inner mounting surface for a specimen, said cylindrical member being enclosed by top and bottom members one of which has a centrally located passage therethrough; and an elongated source of illumination mounted coaxially with the axis of said cylindrical member to illuminate the specimen, said source being movable along the axis of said cylinder through said passageway to remove any illumination from the specimen.

4. Apparatus for testing the color-fastness of a specimen comprising, in combination, a source of illumination emitting light rays having wavelengths in the range between 3,000–9,500 Angstrom units; at least one rotatably mounted member adapted to mount the specimen to be tested on at least two surfaces thereof at a predetermined distance from said source; and means for rotating said mounting member at a predetermined rate so that a portion of the specimen on one surface of said mounting member is illuminated while no illumination reaches that portion of the specimen mounted on the other surface of said mounting member.

5. Apparatus for testing the color-fastness of a specimen comprising, in combination, a source of illumination including a noble gas for emitting light rays having wavelengths substantially in the range of light rays emitted by the sun; a plurality of rotatably mounted members each adapted to mount respectively a specimen to be tested on at least two respective surfaces thereof at a predetermined distance from said source; and means for rotating said mounting members at a predetermined rate so that a portion of the specimen on one surface of each mounting member is illuminated while no illumination reaches that portion of the specimen mounted on the other surface of each mounting member.

6. Apparatus for testing the color-fastness of a specimen comprising, in combination, a source of illumination including a noble gas for emitting light rays having wavelengths substantially in the range of light rays emitted by the sun; at least one rotatably mounted member adapted to mount the specimen to be tested on at least two surfaces thereof at a predetermined distance from said source; and means for continually rotating said mounting member so that a portion of the specimen on one surface of said mounting member is illuminated while no illumination reaches that portion of the specimen mounted on the other surface of said mounting member.

7. Apparatus for testing the color-fastness of a specimen comprising, in combination, a cylindrical member having an inner mounting surface for a specimen; an elongated source of illumination mounted coaxially with the axis of said cylindrical member; a first shielding member mounted between said source and said mounting surface for the specimen for preventing the illumination from said source from reaching a first portion of the specimen while permitting the remaining portion of the specimen to be illuminated; a second shielding member fixedly mounted on one end of said source transverse thereto and substantially closing one end of said cylindrical member; and means for moving said cylindrical member in an axial direction until said second shielding member prevents any illumination from reaching said remaining portion of the specimen while permitting said first portion to be illuminated.

8. Apparatus for testing the color-fastness of a specimen comprising, in combination, a source of illumination emitting light rays having wave lengths in the range between 3000–9500 Angstrom units; a plurality of rotatably mounted members, at least some of said members each having at least three contiguous surfaces respectively parallel to said source and adapted to mount a respective specimen so that that portion of the specimen on one of the surfaces of each of said members of said group of members is illuminated while that portion of the specimen on the other two surfaces of each of said members of said group of members is not illuminated; and means for rotating said members 120° at a time so that the positions of said surfaces are interchanged.

9. Apparatus for testing the colorfastness of a specimen comprising, in combination, support means for mounting the specimen to be tested; artificial illumination means mounted on said support means substantially equidistant from all portions of the surface of said test specimen for illuminating the same, said illumination means including a noble gas for emitting light rays having wavelengths substantially in the range of light rays emitted by the sun; and means for periodically preventing any of the light rays emitted from said illumination source from reaching a portion of said specimen.

10. Apparatus for testing the colorfastness of a specimen, comprising, in combination, support means for mounting the specimen to be tested; a xenon lamp mounted on said support means substantially equidistant from all portions of the surface of said test specimen for illuminating the same; and means for periodically preventing any illumination from said xenon lamp from reaching a portion of said specimen.

11. Apparatus for testing the colorfastness of a specimen comprising, in combination, support means for mounting the specimen to be tested; an artificial source of illumination mounted on said support means substantially equidistant from all portions of the surface of said test specimen for illuminating the same; and means for intermittently and regularly preventing any illumination from said artificial source of illumination from reaching a portion of said specimen.

12. Apparatus for testing the colorfastness of a specimen comprising, in combination, support means for mounting the specimen to be tested; a xenon lamp mounted on said support means substantially equidistant from all portions of the surface of said test specimen for illuminating the same; and means for intermittently and regularly preventing illumination from said xenon lamp from reaching a portion of said specimen.

References Cited in the file of this patent

UNITED STATES PATENTS

| Number | Name | Date |
|---|---|---|
| 1,738,328 | Spielman | Dec. 3, 1929 |
| 1,818,687 | Buttolph | Aug. 11, 1931 |
| 1,969,606 | Hall | Aug. 7, 1936 |
| 2,386,276 | Simjian | Oct. 9, 1945 |
| 2,640,354 | Bernegger | June 2, 1953 |
| 2,656,757 | Stern | Oct. 27, 1953 |